Jan. 22, 1946.　　　　J. E. HALE　　　　2,393,494
BEAD LOCK
Filed June 2, 1942　　　　3 Sheets-Sheet 1

Inventor
JAMES E. HALE

Jan. 22, 1946.   J. E. HALE   2,393,494
BEAD LOCK
Filed June 2, 1942   3 Sheets-Sheet 2
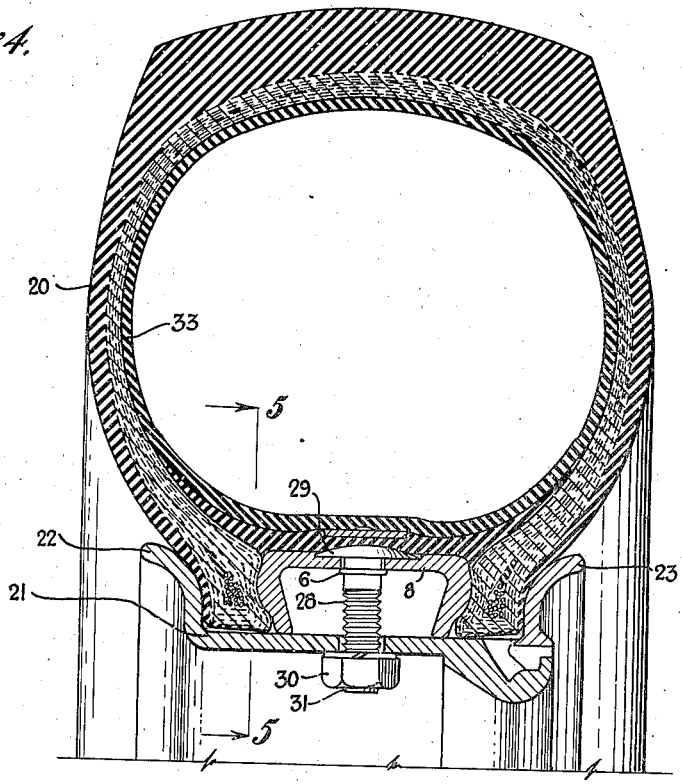
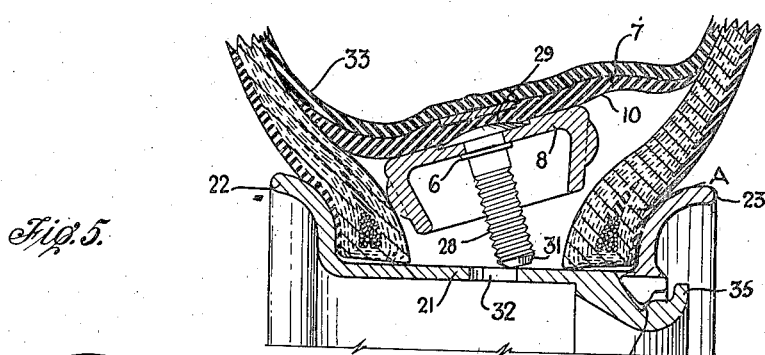
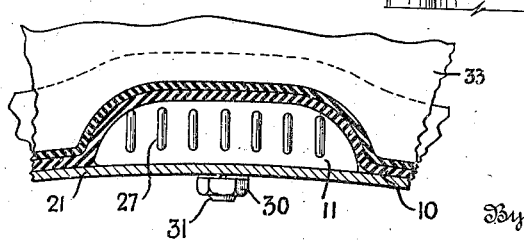
Inventor
JAMES E. HALE

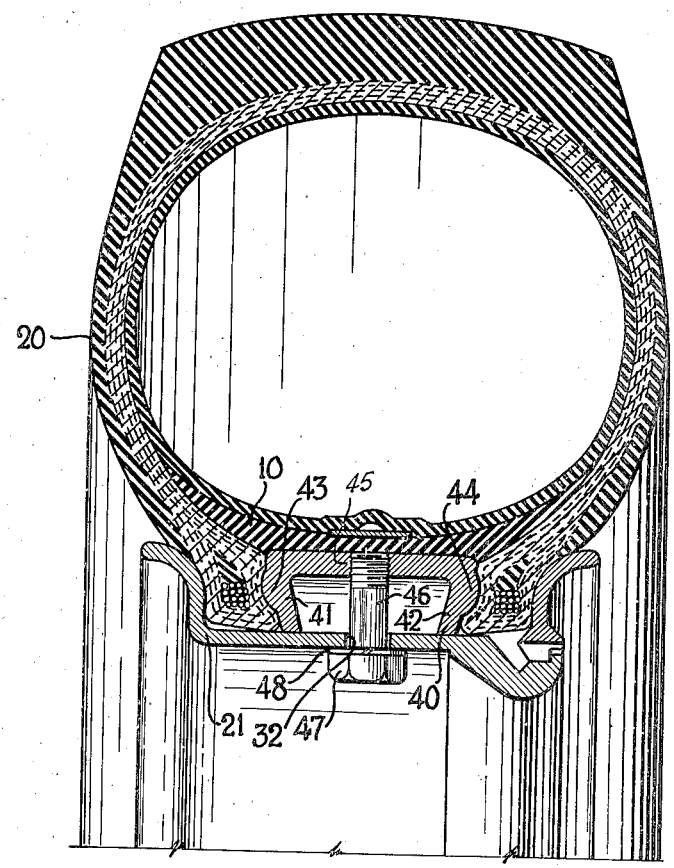

Patented Jan. 22, 1946

2,393,494

UNITED STATES PATENT OFFICE 2,393,494

BEAD LOCK

James E. Hale, Akron, Ohio, assignor to The Firestone Tire & Rubber Company, Akron, Ohio, a corporation of Ohio Application June 2, 1942, Serial No. 445,511

8 Claims. (Cl. 152—401)

This invention relates to bead locks for tire and rim assemblies, and more especially to bead locks adapted to retain a pneumatic tire casing on a tire rim, in torque-transmitting engagement therewith, even when the tire is under-inflated or else completely deflated.

When a pneumatic tire is mounted upon a conventional tire rim of the type that is substantially cylindrical and has a removable flange or side-ring on one edge thereof, it is obvious that the inside diameter of the tire beads must be somewhat larger than the bead seat diameter of the rim in order that the tire readily and conveniently can be applied to the rim, or removed therefrom, by the simple act of telescoping the tire beads over the rim.

In the driving of a motor vehicle, or in the braking thereof, the torques producing the change of motion of the vehicle must be transmitted through the tire without resulting slippage or creeping of the tire relatively of the rim. With properly inflated tires there is usually, but not always, sufficient lateral pressure against the vertical faces of the tire beads to assure obtaining sufficient frictional contact between the outer lateral faces of the tire beads and the tire rim flanges to resist said slippage or creeping.

However, if the air pressure in the tire becomes low in relation to the prescribed air pressure, or if the tire becomes completely deflated, then the absence of laterally outwardly directed pressure against the beads results in an absence of sufficient friction between the outer vertical walls of the tire beads and rim flanges sufficient to translate the said tractive and/or braking forces. Since such conditions are not of infrequent occurrence, it is desirable that supplemental means be provided for urging the tire beads radially into tight frictional engagement with the base of the tire rim.

Attempts have been made to provide pneumatic tire and rim assemblies that can be operated, even though the pneumatic tire thereof is deflated, without causing rotation of the tire relatively of the rim, and without pulling the tire off the rim. Such assemblies generally involve the use of some type of an annular elastic compression member which is carried within a tire on the wheel or rim, and adapted to exert pressure upon the beads of a mounted tire to force the same laterally against the rim flanges. However, such continuous compressible members are costly, and are made from a mass of rubber, or similar composition, which may be difficult to obtain, or which may be difficult to insert in a tire, or which may heat up excessively in use.

An object of the invention is to provide mechanical means for producing a definite radially directed pressure against the beads of a tire to force them against the base of a rim on which the tire is mounted, and to securely hold them there even when the tire is deflated. Such means may be termed a bead lock.

Another object of the invention is to provide an improved bead lock for a pneumatic tire assembly, which bead lock effectively retains the tire beads in fixed relation to a tire rim, and overcomes the aforementioned disadvantages of prior art constructions.

Another object is to provide a bead lock structure adapted for use with standard flat base tire rims that have either a continuous or a discontinuous removable side flange thereon ordinarily received in a gutter formed in one margin of the rim base, or for use with circumferentially divided rims or wheels.

Still another object is to retain a pneumatic tire on a tire rim so that the tire beads are held in fixed torque transmitting contact with the rim base and flanges, regardless of the volume or pressure of air within the tire.

A further object of the invention is to provide apparatus for locking pneumatic tire beads in place and making the vehicle mounted on such tire maneuverable even though the tire is deflated.

Another object is to devise a bead lock which may be inserted in a tire with facility.

Yet another object of the invention is to provide a tire, tube, bead lock, and tire rim assembly having means such as bolts for engaging the bead lock through the rim whereby the bead lock may be drawn radially inwardly to clamp the heads of the tire between the bead lock and the tire rim.

While an improved and satisfactory bead lock is needed for pneumatic tires in ordinary service the adoption of mobile units using pneumatic tires for combat service by the Army has made an effective and practical bead lock of national importance. Pneumatic tires on combat vehicles are exposed to gunfire and bullet-sealing tire inner tubes have been used to prevent the tires from going flat when they were punctured by a bullet. While such tubes may prevent flat tires when they are pierced with bullets they are far from dependable for that purpose. Accordingly pneumatic tires used on mobile equipment in actual combat are exposed to the possibility of having their inner tubes punctured and their inflation pressure lost. A tire in this condition is commonly referred to as a flat tire. A vehicle with a flat tire is not completely immobilized so long as the tire beads remain in position on the tire rim. It is true that with such flat tire the response to the steering of the vehicle is impaired and a reduced speed of travel is usually necessary but as just indicated when the beads stay in position on their rim the vehicle is still mobile and for this reason under these circumstances a soldier can drive such vehicle out of the immediate combat area the advantages of which are self-evident. However, a tire mounted in the conventional manner, that is, with a common tube and flap, will not, when the tire goes flat, remain on the tire rim for more than a limited number of revolutions of the wheel on which the tire assembly is mounted. When a tire has left its rim on a vehicle the vehicle ordinarily cannot be driven in that condition. This is particularly true where the vehicle is of a heavy type and on soft footing as in mud or loose earth. The bead lock involving this invention will retain the beads of a flat tire in their original position on a tire rim and thereby keep mobile equipment on which such flat tire may be mounted until such tire gradually becomes destroyed on its rim by becoming cut and crushed. However such a flat tire held on the rim will ordinarily run as far as fifty miles, perhaps farther on soft earth. This will permit, so far as the mobility of the equipment is affected by a flat tire, the removal of such equipment to a location where the tire may be changed in safety. Of course, the invention is important for use in tire mountings in other than combat service.

The mounting of a large tire together with its tube and flap upon a tire rim under the most favorable conditions is a very difficult task. Under unfavorable conditions, as along the roadside, it often becomes an extremely difficult task. Heretofore, where lugs have been installed between the toes of the beads of a tire or a heavy flap-like ring has been used to keep the beads of a tire spread apart, or where other expediencies have been resorted to of a similar nature and for the same purpose, such installations have so seriously increased the tire mounting problem that the use of such devices were totally impractical. It is a matter of common knowledge to those familiar with the art that a workman skilled in mounting truck tires will have a long struggle when he has a stubborn tire to mount. In fact when such stubborn mounting is experienced some skilled workmen are unable to accomplish the mounting, particularly in getting the rim flanges and lock rings to seat properly. A number of factors enter into the difficulty of mounting which are well known, however, the necessity for a comparatively tight fit of the tire bead to its rim, necessary tolerances in rim and the mold manufacturing and distortion of a finished tire in storage may be mentioned as important factors in the problem. Thus it is that any additional difficulty of mounting over the normal task is undesirable and if at all pronounced may be fatal to the possibility of mounting. The present inventon provides positive bead locking means without interfering with the mounting of the tire rim flanges or lock rings, as will be seen as the specification progresses.

There are other important factors in the use of bead lock devices which must be considered. One important factor in obtaining good service from a tire is to prevent the bead of a tire from having a pronounced rocking action over its rim flange. Such rocking usually is accompanied by action at the toe of the tire bead and one way of controlling such rocking is to provide a tire flap or tube that will contact the toe of the tire bead in service where it will be pressed firmly against the toe by the internal air pressure within the tire inner tube. It is not enough that the toe of the tire bead be so held at intermittent points but for best results the tire bead toe should be held firmly over its entire length. The present invention provides means for firmly contacting the toes of the beads of a tire preventing action over their entire length.

These and other advantages and objects of the invention will be manifest to those familiar with the art by reference to the accompanying drawings wherein:

Fig. 3 is a sectional view showing a tire in the process of being mounted on its rim, the tire having an ordinary inner tube and the bead lock shown in Fig. 1 mounted in the tire and illustrating the relative position of the several members of the assembly when a bead of the tire is forced transversely and inwardly of the tire rim to permit the mounting of a side ring;

Fig. 4 is the same as Fig. 3 except Fig. 4 shows the parts shown in Fig. 3 as they appear when in operative position in an inflated tire with a nut run down and tightened on the bolt as shown; and Fig. 5 is a cross-sectional perspective view taken longitudinally through a short length of a mounting on approximately line 5—5 of Fig. 4 and illustrating the position the inner tube, the bead lock and the base of the rim occupy relatively of each other when the assembly is in road service.

Fig. 6 is a view similar to Fig. 4 but illustrating a modification of the lug and bolt.

Figure 1:
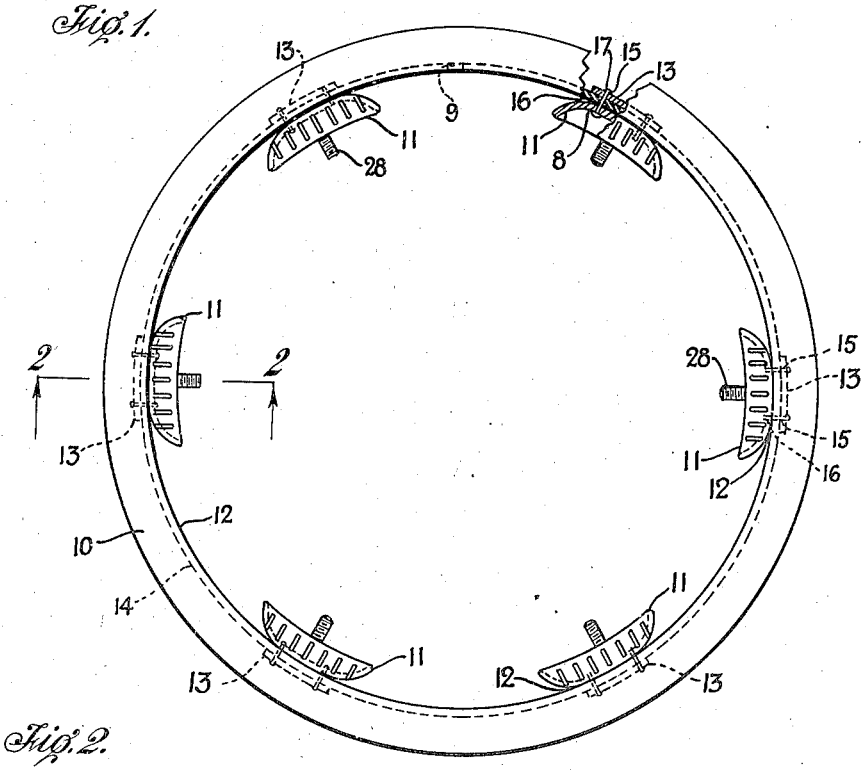
Fig. 1 is a side elevation of a bead lock embodying the invention and showing the bead lock lugs permanently attached to a rubber flap and spaced equi-distant on the inside circumference of the base of the flap, also having a fragment broken away to show the permanent attachment means.
Figure 2:
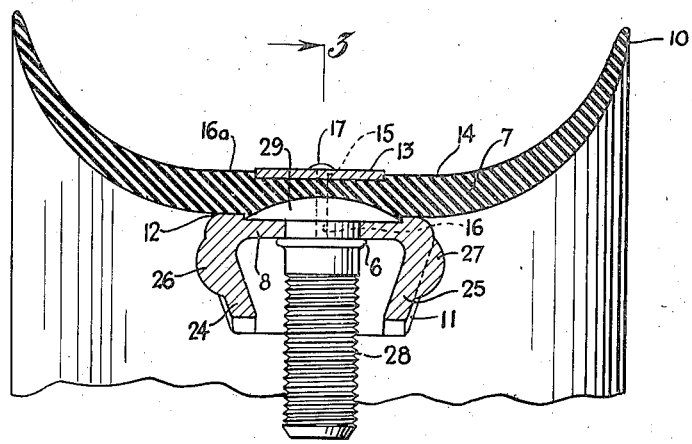
Fig. 2 is a cross-sectional perspective view on line 2—2 of Fig. 1 showing a short length of the bead lock.

Referring particularly to Fig. 1 there is shown an endless molded rubber flap 10 having a conventional inner tube valve hole 9 and with a plurality of metal bead locking lugs 11 spaced equi-distant and permanently attached to the inside circumferential base 12 of the flap 10. The permanent attachment of each of the lugs 11 to the flap is effected by means of a thin steel plate 13. The plate 13 may be any gauge found satisfactory, however, I have found that 22 ga. gives good results in that it bends sufficiently to conform to the curvature of the contour of the outside circumferential grooved face 14 of said flap 10. The plate 13 is provided with rivet holes 15 to receive rivets to connect the plate 13 to a lug 11 as will now be explained. The said plate and lug are permanently attached to the flap 10 by centering the plate 13 in the groove of said flap with the longitudinal edges of the flap and plate substantially parallel and the rivet holes 15 of the plate aligned with rivet holes 16 in a lug 11 positioned and held by any satisfactory means against the inside circumferential base 12 of the flap. Rivets 17 are next placed in the rivet holes 15 and 16, the rivet extending through the body 7 of the flap 10. The rivets may be forced through the flap by a blow from a hammer; however, it is preferable to punch rivet holes through the flap using an ordinary punch of proper size and locating the rivet holes in the flap according to the placement of the plate 13 described above. After the rivets are in their position extending through the plate 13, the flap 10, and a wall 8 of the lug 11, rivet heads are formed in a conventional manner. Care is taken to have the rivet head in the plate 13 rounded and smooth as the inner tube of a tire comes into contact with this plate 13 and its rivet heads. This first plate and lug are located on the flap with regard to the inner tube valve stem hole in the flap. The present illustration of the invention is in connection with a tire having a 20" bead diameter and I have found that a bead lock of six lugs is satisfactory for this size. These six lugs are applied to the flap in like manner as just explained, the first lug attached being spaced at such distance from the valve hole in the flap 10 as will center said valve hole between two of the equi-spaced lugs 11. The bead lock lug 11 is of a shape that permits it to make a wedge fit between the beads of a tire 20 mounted on a rim 21. The rim 21 shown in cross-section in Fig. 3 is one common type of tire rim and it has an integral side flange 22 and a detachable side flange 23. Widths between tire rim flanges have been standardized; accordingly when the tire rim size on which a tire is to be mounted is known the distance between the beads of a tire mounted on such rim is determinable subject to the variation in the width of the beads of the tire. While the bead width variation is not extreme between tires made to the same specification of a single manufacture, yet it is enough to present a problem in locking tire beads in position on their rims. Returning now to the bead locking lug 11 it will be seen that it is of an inverted channel shape in section and having sidewalls 24 and 25. The length of the lug is somewhat greater than its width. It is longitudinally arcuate, its radius of curvature being such that its concave face will rest flush upon the perimeter of the tire rim, between the flanges thereof. The lateral outer faces of the lug are formed with a series of outwardly projecting gripping bars 26 and 27. Each lug 11 is formed with a central opening adapted to receive a carriage bolt 28. As will best be seen by reference to Fig. 3 the opening or bolt hole in the wall 8 is countersunk to receive the head 29 of the bolt 28. The bolt is held in permanent attachment with the lug by the upset shank portion 6. It will be noted that the usual carriage bolt head has been ground down to form a thin, smooth, slightly convex head. It is to be understood, of course, that the bolt 28 is in position in the lug 11 before the lug 11 is attached to the flap 10 by means of the rivets 17 and the plate 13. Thus it will be seen that the bolt head 29 is in contact with the base 12 of the flap 10. Due to the shape and height of said bolt head 29 the rubber compound of which the flap is formed will receive said bolt head without substantial distortion of the flap. The length of the bolt 28 is such as to extend through the lug 11, the rim 21 and project its threaded portion through said rim a distance to receive and retain a nut 30. The threaded end of the bolt 28 terminates in a beveled surface 31, said beveled surface being on a 45° angle with the axis of the bolt. For the best results the height of this bevel, on a 5/8" bolt should be not less than 1/16" nor more than 1/8" and the end of the bolt should be free of burrs. The component parts of the assembly shown in Fig. 1 has been described in sufficient detail to disclose their structure to those familiar with the art and the process of their assembly has also been described.

The assembly of the bead lock shown in Fig. 1 with a tire and rim will now be described.

Suitable holes 32 to receive the threaded ends of the bolts 28 are formed in the tire rim 21. These holes 32 are spaced centrally equi-distant around and through the circumferential length of said rim. The spacing of said holes is such that said bolts will be aligned with the rim holes when the inner tube valve of the assembly is placed in operative position through the valve hole of the flap and the valve hole of the rim. This, of course, requires a relative placement of the valve hole in the flap, and the position of attachment of the lugs as indicated hereinabove. A conventional tire 20 to be mounted on the rim 21 has a tube 33 inserted in the usual manner. Then the bead lock 10 is inserted in the same manner as tires with tubes are "flapped" and then the next step is placing the tire, tube and bead lock on the rim 21. As will be understood the removable flange 23 is not mounted on the rim until after the tire has been placed on the rim and the tire bead on the flange 22 side has been pressed against said flange 22. An important feature of the invention is involved in this initial application of the tire to its rim. The flap 10, as has been stated, is an endless molded rubber flap and it is of the usual size. That is, a flap of larger diameter than one which ordinarily would be used with the tire 20 and the rim 21 is not used. It is possible to use such regular flap with the present assembly because the flap being of rubber it is a simple matter to push the lugs attached to the flap 10 outwardly into the tire, stretching the flap and thereby providing clearance for the bead A to pass onto the said rim. After both tire beads are on the rim 21 as shown in Fig. 4 the flange 23, which is in the form of a continuous ring is mounted in operative position. Another important advantage of the invention is seen in this operation. In order to mount the flange 23 (or any flange ring on any type of tire rim) it is necessary to force the tire bead indicated as A in Fig. 3 toward the opposite bead until a portion of the base of the flange 23 can be drawn down into a circumferential groove 34 to provide clearance for said flange to pass over a raised portion 35 of the said rim. This operation will be well understood by those familiar with the art. After the flange 23 is in position it will be seen that the ends of the bolts 28 are substantially aligned with the holes 32 of the rim and that it is a simple matter by the use of a special tool or simply a stick to reach through said holes 32 and move the bolts enough so that their ends will drop through said rim hole. A nut 30 is run on the threaded portion of the bolt and tightened on said threads until the lugs 11 are drawn radially into contact with the beads of the tire. The width of the lug 11 is predetermined so that a wedged or spreader contact with the tire beads is assured. The extended portions 26 and 27 of the lugs 11 are pressed against and into the beads of the tire thus providing additional anchorage between the lugs and the tire beads. These extended portions are also a compensating feature as it is not necessary to use as wide a main body for the lug as otherwise would be the case as said portions will contact the beads and if the clearance variation is on the narrow side, these portions will impress themselves into the beads of the tire thereby not only adding to the grip of the lugs on the said beads but also insuring a firm contact even though considerable variations in width of beads were encountered. The tapered ends of the bolts are of practical importance. In mounting the tire 20 the ends 31 of the bolts 28 drag or are pushed along the surface of the rim 21. If the ends of the bolts were sharp they would often enter the groove 34 and block the bead A of the tire from going on the rim. On the other hand if the ends of said bolts were flat, a square edge would be presented to the groove 34 and bind the bolt between the bead A and the groove and prevent the mounting of the tire. Similarly the shape of the ends of the bolts is of importance when it is desired to get the bolts to extend inwardly through the hole 32 of the rim. While the bolts are in substantial alignment with holes 32 it is necessary at times to do some fishing through the holes in order to get the bolts started through said holes. It is such details as this that makes the mounting of tires possible or impossible as the case may be and their importance cannot be exaggerated. It has been found that a taper with the limitations as described hereinabove prevents the binding of the bolts in grooves or on edges on any type of rim and that such taper permits the ends of the bolts to readily enter into the holes 32. Yet another important feature of the invention is best shown in Fig. 5. As heretofore indicated it is desirable that rocking of a tire bead over the flare of a tire rim flange be prevented. Obviously the beads of the tire will be held and gripped firmly from the toes of the bead outwardly along the lateral faces of the lugs 11 as the lugs are drawn radially inward against the said beads and it has been seen how the present invention provides for the practical and convenient installation of the bead locking device. It is now pointed out that after installation and inflation pressure has been built up in the inner tube of the tire, the inner tube 33 presses the tube base and wall against the flap and the flap moves into contact with and conforms to the surfaces presented by the ends of the lugs 11, the tire beads and that portion of the rim which is exposed betwen said beads and lugs. Thus the flap and the lugs together provide a firm pressure against the beads of the tire throughout the circumferential length of the beads and of great importance this pressure extends to the tip of the toe of said tire beads.

If in service a tire mounted with the bead lock constituting this invention as described becomes punctured and goes flat, it will be seen that the beads of the tire are positively clamped between the rim base and flanges and the lugs and that the tire cannot leave the rim. The beads will be held apart against their flanges and thus give the flat tire a substantial degree of stability so that a vehicle on which the tire is mounted may be driven until the tire becomes destroyed from having been driven flat. It will also be seen that the present invention provides a bead locking assembly that gives complete anchorage to the beads during the tire's service and thereby does not detract from the normal life of the tire. Further, it will be seen that the present bead locking means constituting the invention has overcome the tire mounting difficulties heretofore caused by such devices.

Referring now to Fig. 6 there is shown there a modification of the bead locking lug shown in Fig. 4. It is longitudinally arcuate, its radius of curvature being such that its concave face will rest flush upon the perimeter of the base of the tire rim, between the flanges thereof. The lateral outer faces of the lug are formed with a series of outwardly projecting gripping bars. Each lug 40 is formed with an internally threaded portion 45 adapted to receive the end of a bolt 46 having a head 47. It is to be understood that lug 40 is attached to an endless rubber flap 10 the same as lug 11 is attached by means of rivets and a plate shown in Fig. 1. The length of the bolt 46 is such as to extend its threaded end through holes 32 in rim 21 a distance sufficient to engage the internal threads of said lug whereby by tightening said bolt the lugs 40 will be drawn radially tight against the beads of the tire 20 with the head 47 of bolt 46 against the radially inner surface of said rim. If found desirable a lock washer 48 may be used between the bolt head and the rim.

Only one modification of the invention has been discussed but it will be obvious to those skilled in the art that other modifications may be resorted to without departing from the spirit of the invention, or the scope thereof as defined by the appended claims.

I claim:

1. A bead lock for pneumatic tires comprising a molded endless rubber flap, and a plurality of rigid lugs permanently attached thereto and spaced equi-distantly thereabout and extending inwardly from the base of said flap, said lugs having a greater length than width and having inclined sidewalls and inwardly turned ends, said lugs having bolts permanently attached thereto, the threaded ends of said bolts being adapted to project through holes in the base portion of a rim on which a tire is mounted and to receive nuts whereby the said bead lock is held in operative position when said nuts are tightened against the inside surface of said rim.

2. A bead lock for pneumatic tires comprising an elastic band, and a plurality of rigid lugs permanently attached thereto and spaced equi-distantly thereabout and extending inwardly from the base thereof, said lugs having greater length than width and having inclined sidewalls and inwardly turned ends, said lugs having bolts permanently attached thereto, the threaded ends of said bolts being adapted to project through holes in the base portion of a rim on which a tire is mounted and to receive nuts whereby the said bead lock is held in operative position when said nuts are tightened against the inside surface of said rim.

3. A bead lock for pneumatic tires comprising a molded endless rubber flap, and a plurality of rigid lugs permanently attached thereto spaced equi-distantly about and extending inwardly from the base of said flap, said lugs having greater length than width and having inclined sidewalls and inwardly turned ends, said sidewalls having outwardly laterally extending bead gripping portions, said lugs having bolts permanently attached thereto, the threaded ends of said bolts being adapted to project through holes in the base portion of a rim on which a tire is mounted and to receive nuts whereby the said bead lock is held in operative position when said nuts are tightened against the inside surface of said rim.

4. In a bead lock for pneumatic tires, the combination of a plurality of circumferentially spaced rigid tire bead clamping units, and an endless band of elastic material to the inside face of which said units are permanently attached, said units being provided with external attachment means adapted to extend radially inwardly through holes in the base of a tire rim and to have holding means attached thereto whereby said clamping units are drawn radially inwardly firmly against the beads of a tire.

5. In combination a pneumatic tire, an inner tube, a tire rim, and a bead lock, said bead lock including an elastic tire flap-like band with circumferentially spaced rigid bead clamping lugs permanently attached to the inside circumferential surface thereof, the circumference of said band being such as to normally press said lugs radially inwardly close to the periphery of the base of said rim when the band is placed thereon, said lugs having tapered sides, said lugs having bolts attached thereto, the threaded ends of said bolts being adapted to project radially inwardly through holes formed through the base of said rim and to receive tightening nuts on said threaded end, said lugs being adapted to move radially outwardly when the sloping sides of the beads of said tire contact said tapered sides in the operation of mounting a tire on said rim thereby causing said band to stretch and permit said lugs to move out of the way of said beads, said stretched band being adapted to contract and press said lugs close to said rim base when said beads are seated in operative position on said rim, whereby said bolts may be projected radially inwardly through said holes and receive said nuts and thereby provide means whereby said lugs are drawn radially inwardly firmly against the beads of said tire.

6. In a bead lock for pneumatic tires, the combination of an endless band of elastic material, a plurality of bead clamping units permanently attached to the inner side of said band, said units having attaching means adapted to engage a tire rim to draw said units radially inwardly against said tire rim and to hold said clamping units in fixed operative position relative to said tire rim.

7. In combnation with a pneumatic tire having inextensible beads, tube and tire rim assembly, and a bead lock, said lock comprising an endless band of elastic material, a plurality of bead clamping units permanently attached to the inner side of said band, said units having attaching means engaging said tire rim to hold said clamping units in fixed operative position relative to said rim.

8. In combination, a pneumatic tire, an inner tube, a tire rim and a bead lock, said bead lock including an elastic tire flap-like band with circumferentially spaced rigid bead clamping lugs permanently attached to the inside circumferential surface thereof, the circumference of said band being such as to normally press said lugs radially inwardly close to the periphery of the base of said rim when the band is placed thereon, said lugs having tapered sides, attaching means for each of said lugs having complementary engaging elements, one element of which extends through a hole formed in said tire rim, said lugs being adapted to move radially outwardly when the sloping sides of the beads of said tire contact said tapered sides in the operation of mounting a tire on said rim thereby causing said band to stretch and enable said lugs to move out of the way of said beads, said stretched band being adapted to contract and press said lugs close to said rim base when said beads are seated in operative position on said rim, whereby said attaching means for said lugs may be held against said tire rim to receive the complementary elements adapted to extend through said holes in said rim.

JAMES E. HALE.